US012064959B2

(12) United States Patent
Wada et al.

(10) Patent No.: US 12,064,959 B2
(45) Date of Patent: Aug. 20, 2024

(54) PRINTING APPARATUS WITH DETACHABLE PLACEMENT UNIT

(71) Applicant: CANON KABUSHIKI KAISHA, Tokyo (JP)

(72) Inventors: Itaru Wada, Kanagawa (JP); Yasuyuki Asai, Tokyo (JP); Hiromasa Yoneyama, Kanagawa (JP); Ryohei Maruyama, Kanagawa (JP); Yoshiaki Suzuki, Chiba (JP); Tomohito Abe, Kanagawa (JP); Tsutomu Obata, Tokyo (JP); Noriyuki Aoki, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 67 days.

(21) Appl. No.: 17/888,890

(22) Filed: Aug. 16, 2022

(65) Prior Publication Data

US 2022/0388318 A1 Dec. 8, 2022

Related U.S. Application Data

(63) Continuation of application No. 17/192,003, filed on Mar. 4, 2021, now Pat. No. 11,541,674.

(30) Foreign Application Priority Data

Mar. 6, 2020 (JP) ................................ 2020-039214

(51) Int. Cl.

| | |
|---|---|
| ***B41J 11/00*** | (2006.01) |
| ***B41J 2/01*** | (2006.01) |
| ***B41J 3/46*** | (2006.01) |
| ***B41J 11/66*** | (2006.01) |

(Continued)

(52) U.S. Cl.
CPC ............ *B41J 11/0095* (2013.01); *B41J 2/01* (2013.01); *B41J 3/46* (2013.01); *B41J 11/66* (2013.01); *B41J 11/70* (2013.01); *B41J 13/106* (2013.01)

(58) Field of Classification Search
CPC ... B41J 11/0095; B41J 2/01; B41J 3/46; B41J 11/66; B41J 11/70; B41J 13/106
See application file for complete search history.

(56) References Cited

U.S. PATENT DOCUMENTS

| | | | |
|---|---|---|---|
| 5,729,791 | A | 3/1998 | Kutsuwada et al. |
| 9,579,907 | B2 | 2/2017 | Shinjo et al. |
| 10,967,658 | B2 | 4/2021 | Yoneyama et al. |

(Continued)

FOREIGN PATENT DOCUMENTS

| | | | |
|---|---|---|---|
| JP | 06-329319 | A | 11/1994 |
| JP | 2002-338125 | A | 11/2002 |

*Primary Examiner* — Henok D Legesse
(74) *Attorney, Agent, or Firm* — Venable LLP

(57) ABSTRACT

A printing apparatus includes a conveyance unit configured to be able to convey a roll sheet that is wound in a rolled shape and a cut sheet that is not wound in a rolled shape to a printing unit configured to print an image, a receiving unit detachably attached to the apparatus, the receiving unit being configured to receive the cut sheet onto which printing has been performed by the printing unit; a detection unit configured to detect whether the receiving unit is attached to the apparatus; and a holding unit configured to, in a case where the detection unit detects that the receiving unit is not attached to the apparatus, nip to hold the cut sheet onto which printing has been performed by the printing unit.

13 Claims, 5 Drawing Sheets

(51) Int. Cl.
*B41J 11/70* (2006.01)
*B41J 13/10* (2006.01)

(56) References Cited

U.S. PATENT DOCUMENTS

| | | | | |
|---|---|---|---|---|
| 11,541,674 | B2 * | 1/2023 | Wada | B41J 11/66 |
| 2004/0131406 | A1 * | 7/2004 | Ohki | G03G 15/6576 399/385 |
| 2006/0082632 | A1 | 4/2006 | Kinoshita | |
| 2011/0068535 | A1 * | 3/2011 | Amamoto | G03G 15/6573 271/278 |
| 2013/0033715 | A1 * | 2/2013 | Takasaki | G03G 15/6573 358/1.12 |
| 2016/0090255 | A1 | 3/2016 | Higuchi | |
| 2021/0197582 | A1 | 7/2021 | Suzuki et al. | |

* cited by examiner

PRINTING APPARATUS WITH DETACHABLE PLACEMENT UNIT

BACKGROUND OF THE INVENTION

Field of the Invention

The present invention relates to a printing apparatus.

DESCRIPTION OF THE RELATED ART

Some printing apparatuses can handle various sheet sizes that comply with a predetermined standard such as A sizes (e.g., A0 size and A1 size), B sizes (e.g., B0 size and B1 size), and the like. Also, although some printing apparatuses comprise a placement unit (also expressed as receiving unit, tray, stacker, etc.) for placing sheets that are discharged (hereinafter, discharge sheets) from the main body of an apparatus, it is conceivable that in printing apparatuses that can handle various sizes, this placement unit can be attached or detached in relation to the main body of an apparatus (refer to Japanese Patent Laid-Open No. 2002-338125).

In the aforementioned printing apparatuses, unintended printing may be performed in a state in which the placement unit is not attached to the main body of an apparatus. In such a case, the discharge sheet, by dropping from the main body of an apparatus, may receive unnecessary damage, which could cause a decrease in printing quality.

SUMMARY OF THE INVENTION

The present invention is a printing apparatus that can handle various sizes and has an exemplary objective of improving printing quality in printing apparatuses in which a placement unit for placing discharge sheets can attach or detach in relation to the main body of an apparatus.

One of the aspects of the present invention provides a printing apparatus, comprising a conveyance unit configured to be able to convey a roll sheet that is wound in a rolled shape and a cut sheet that is not wound in a rolled shape to a printing unit configured to print an image, a receiving unit detachably attached to the apparatus, the receiving unit being configured to receive the cut sheet onto which printing was performed by the printing unit, a detection unit configured to detect whether the receiving unit is attached to the apparatus, and a holding unit configured to, in a case where the detection unit detects that the receiving unit is not attached to the apparatus, nip to hold the cut sheet onto which printing was performed by the printing unit.

Further features of the present invention will become apparent from the following description of exemplary embodiments (with reference to the attached drawings).

DESCRIPTION OF THE EMBODIMENTS

Figure 1:
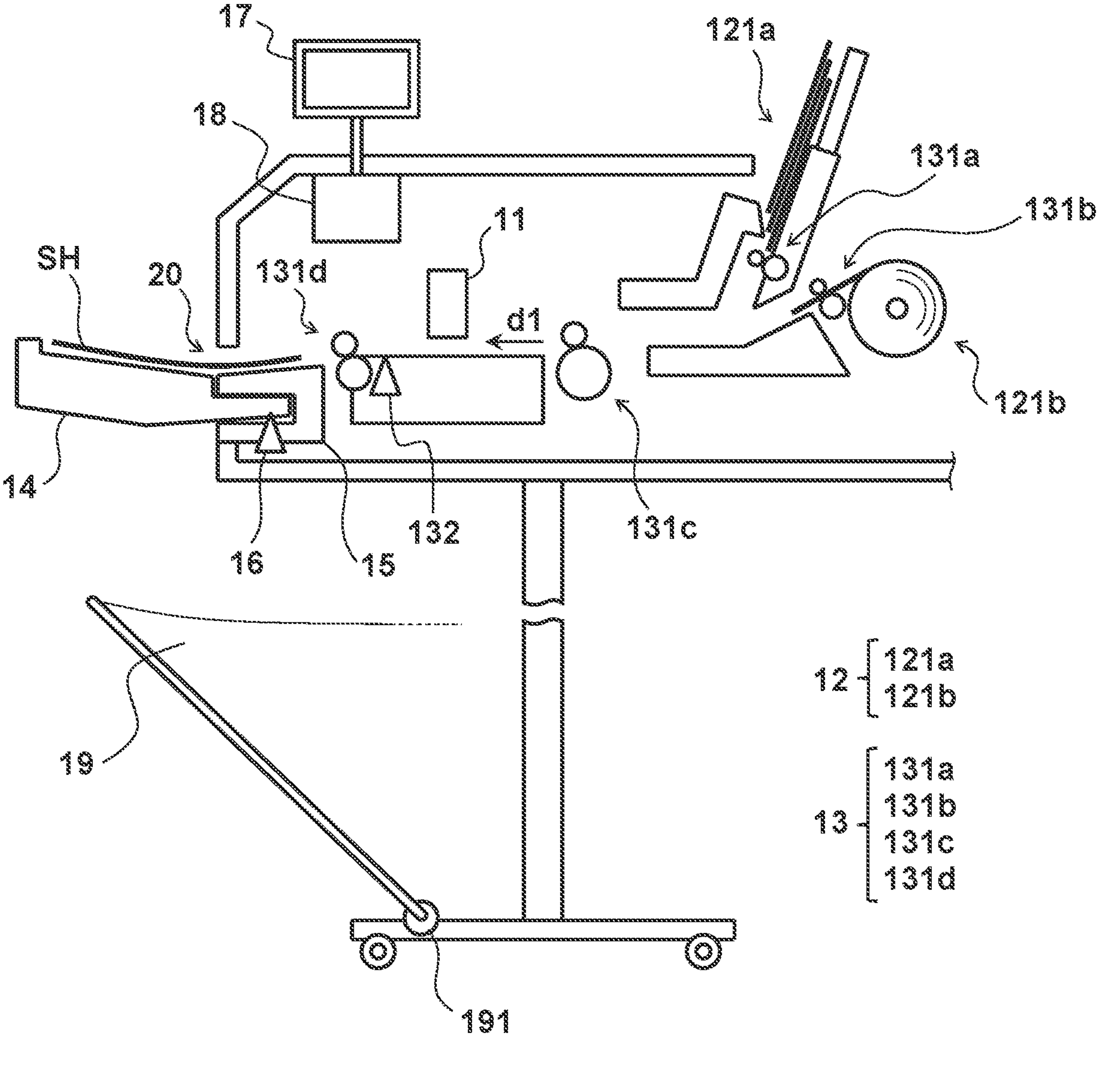
FIG. 1 is a schematic side view illustrating an example of a configuration of a printing apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Configuration of Printing Apparatus

Figure 5:
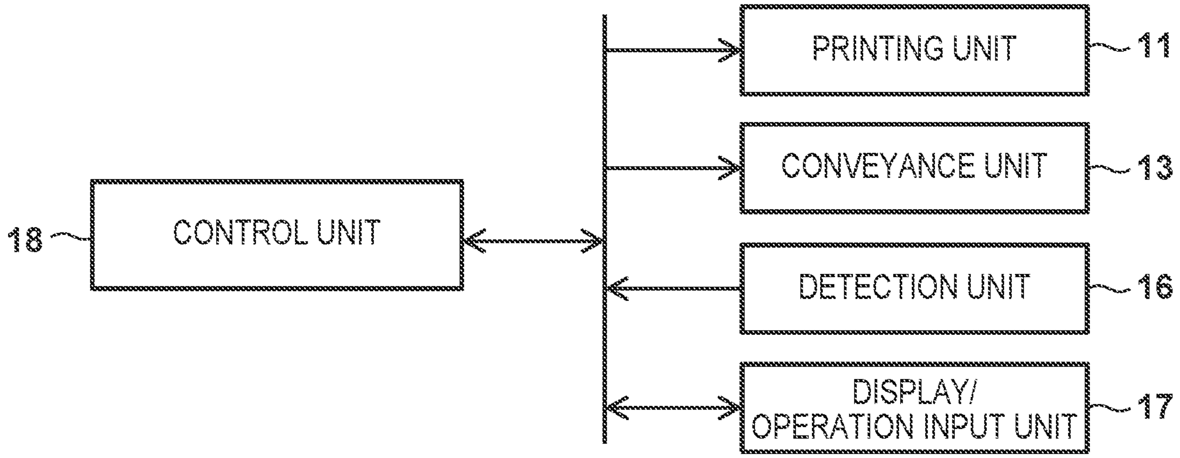
FIG. 5 is a block diagram illustrating an example of the configuration of the printing apparatus.

FIG. 1 illustrates an example of a configuration of a printing apparatus 1 according to an embodiment, and FIG. 5 illustrates the block diagram thereof. The printing apparatus 1 comprises a printing unit 11, an accommodation unit 12, a conveyance unit 13, a placement unit 14, an attachment unit 15, a detection unit 16, a display/operation input unit 17, a control unit 18, and a discharge basket 19.

In the printing unit 11, a printhead that can execute printing onto a sheet SH may be used. It is assumed that in the present embodiment, the printing unit 11 performs printing by an inkjet method, and on a side that faces the sheet SH of the printing unit 11, a plurality of nozzles for discharging ink in relation to the sheet SH is provided. As another embodiment, another printing method may be employed in the printing unit 11.

Also, the printing unit 11, in the present embodiment, is configured by a so-called serial head method (multipass method) and can scan in a sheet widthwise direction by a carriage. As another embodiment, the printing unit 11 may employ a so-called line head method (single pass method) in which a plurality of nozzles are provided across the entirety of a region that corresponds to the widthwise direction of the sheet. The accommodation unit 12 is configured to be able to respectively accommodate, as a target to be selected as a printing medium (hereinafter, printing target), a cut sheet in a size that complies with a predetermined standard and a roll sheet which is a long sheet wound in a rolled shape. In the present embodiment, the accommodation unit 12 includes a cut sheet stacking unit 121*a* that is configured such that a plurality of cut sheets can be stacked, and in a position that is different from the stacking unit 121*a*, a roll sheet mounting unit 121*b* onto which a roll sheet is mounted so as to be rotatable. Also, the cut sheet stacking unit 121*a* is disposed further on a downstream side in a conveyance direction d1 than the roll sheet mounting unit 121*b* (refer to FIG. 1). Note that as an example of the above predetermined standard, a JIS standard (Japanese Industrial Standards) can be given.

The conveyance unit 13 includes a plurality of conveyance rollers 131*a* to 131*d* for conveying the sheet SH from the accommodation unit 12. A pair of rollers 131*a* conveys, by rotating while sandwiching the cut sheet, from the cut sheet stacking unit 121*a* to a downstream side one sheet at a time. A pair of rollers 131*b* conveys, by rotating while sandwiching the roll sheet, from the roll sheet mounting unit 121*b* to a downstream side one sheet at a time. A pair of rollers 131*c* is disposed on the downstream side of the rollers 131*a* and 131*b* and on the upstream side of the printing unit 11. The pair of rollers 131*c* conveys, by rotating while sandwiching the cut sheet conveyed from the cut sheet stacking unit 121*a* or the roll sheet conveyed from the roll sheet mounting unit 121*b*, the cut sheet or the roll sheet toward the printing unit 11 as the sheet SH. Also, a pair of rollers 131*d* conveys, by rotating while sandwiching the sheet SH onto which printing was performed by the printing unit 11, the sheet SH toward a discharge port 20. Although details will be described later, the pair of rollers 131*d* may function, by sandwiching, in a state in which rotation has stopped, the sheet SH discharged from the discharge port 20 (hereinafter, may be expressed as discharge sheet SH), as a holding unit that holds the discharge sheet SH. When holding, a predetermined pressing force may be applied from one roller in relation to the other roller of the pair of rollers 131*d*. This holding is also expressed as nipping and the like, and in this regard, the pair of rollers 131*d* can also be represented as a nip unit, nip rollers, and the like. Moreover, although it is assumed that the rollers 131*d* that perform conveyance (discharging) of the sheet SH also serve a function of a holding unit in the present embodiment, configuration may be such that the printing apparatus 1 comprises the holding unit which does not perform conveyance of the sheet SH and of which the object is only to hold.

On the upstream side of the rollers 131*d* and on the downstream side of the printing unit 11, a detection unit (second detection unit) 132 that detects the existence or absence of the discharge sheet SH is provided. The detection unit 132, in addition to detecting whether or not the sheet SH was appropriately discharged from the discharge port 20 and although details are described later, can also detect whether or not the sheet SH that is held by the pair of rollers 131*d* was removed by a user. Alternatively or additionally, a torque sensor or the like may be provided with the rollers 131*d* themselves as the detection unit 132.

Here, in a case where the roll sheet is the printing target, the roll sheet is cut by a cutter unit not shown) at a position in accordance with the length of printing that is based on a print job (print data), and then the cut sheet is discharged from the discharge port 20 by the rollers 131*d*. The above cutler unit may be configured to be able to couple with the carriage that scans the printing unit 11 or may be incorporated in the carriage. Also, the cutter unit may be configured to move itself by a driving source different from that of the carriage.

Note that in this specification, it is assumed that the downstream side indicates a side in the conveyance direction d1 (forward direction) in the path in which the sheet SH is conveyed by the conveyance unit 13 and that the upstream side indicates a side in the opposite direction from the conveyance direction d1 in the conveyance path.

The placement unit 14 is provided to be able to attach or detach in relation to the main body of the printing apparatus 1, In a case where the placement unit 14 is attached onto the main body of the printing apparatus 1, the discharge sheet SH may be placed on the placement unit 14. The placement unit 14 is also expressed as a receiving unit, a discharge tray, a discharge stacker, and the like or may be represented simply as a tray, a stacker, and the like. Also, the placement unit 14 may be expressed as an acceptance unit and the like as it accepts the discharge sheet SH from the main body of the printing apparatus 1.

The attachment unit 15 is configured so that the placement unit 14 can attach in relation to the main body of the printing apparatus 1 and for example, may be configured so that the placement unit 14 can freely be inserted or extracted and/or locked.

The detection unit 16 is provided on the attachment unit 15 and is configured to be able to detect whether or not the placement unit 14 is attached onto the main body of the printing apparatus 1. In the detection unit 16, a sensor that can detect by an electrical connection an existence or absence of the placement unit 14 may be used or a press-type switch that is pressed by the placement unit 14 being attached may be used.

The display/operation input unit 17, in addition to being able to display predetermined information, is configured to be able to accept an operation input by the user, and in the present embodiment, it is assumed that a touch panel display is used in the display/operation input unit 17. As another embodiment, the display unit may be provided separately from the operation input unit, and the operation input unit may be a button and the like that can be pressed by the user. Also, in the present embodiment, the display/operation input unit 17 functions as a notification unit for performing a predetermined notification to the user, and in the display/operation input unit 17, an audio source for sounding an alerting sound and the like may be additionally provided.

The control unit 18 functions as a system controller that drives and controls a system of the printing apparatus 1 as a whole. For example, the control unit 18, based on a print job inputted into the printing apparatus 1, by driving and controlling the printing unit 11 and the conveyance unit 13, performs printing onto the sheet SH while conveying the sheet SH. Note that the print job may be received from an external apparatus (e.g., a personal computer of the user, etc.) or may be inputted into the display/operation input unit 17.

For example, the control unit 18, by driving and controlling each electric motor, performs printing onto the sheet SH by the printing unit 11 while driving the conveyance unit 13 to convey the sheet SH After the printing is completed, the control unit 18 further drives the conveyance unit 13 to have the sheet SH, onto which printing was performed, discharged from the discharge port 20, and can start the next printing if necessary.

The control unit 18 may be realized by a single unit or may be realized by electrically connecting two or more units to be able to communicate with each other. Also, the control unit 18 may be configured by a semiconductor apparatus such as an ASIC (application specific integrated circuit) and a PLD (programmable logic device) or may be configured by a CPU (central processing unit) and a memory. In other words, the function of the control unit 18 can be realized by both hardware and software.

Although details will be described later, the control unit 18, based on a detection result from the detection unit 16, can perform the predetermined notification to the display/operation input unit 17.

The discharge basket 19 is provided beneath the discharge port 20. The discharge basket 19 is configured to be foldable and when in use, can be in a state in which it is opened (hereinafter, use state) by a user operation and when not in use, can be in a state in which it is folded (hereinafter, non-use state) by a user operation. In other words, the discharge basket 19 can transition between the use state and the non-use state. For example, the discharge sheet SH whose sheet length is relatively large is difficult to place on the placement unit 14 and so the discharge basket 19 in the use state can accept from the discharge port 20 such a discharge sheet SH. In the discharge basket 19, a detection unit (third detection unit) 191 that detects whether the state is the use state or the non-use state is provided.

In the present embodiment, to facilitate understanding, it is assumed that in a case where the cut sheet is used as the printing target, the discharge sheet SH is placed on the placement unit 14 and that in a case where the roll sheet is used as the printing target, the discharge sheet SH is discharged into the discharge basket 19.

Form of Printing by Printing Apparatus

Figure 2:
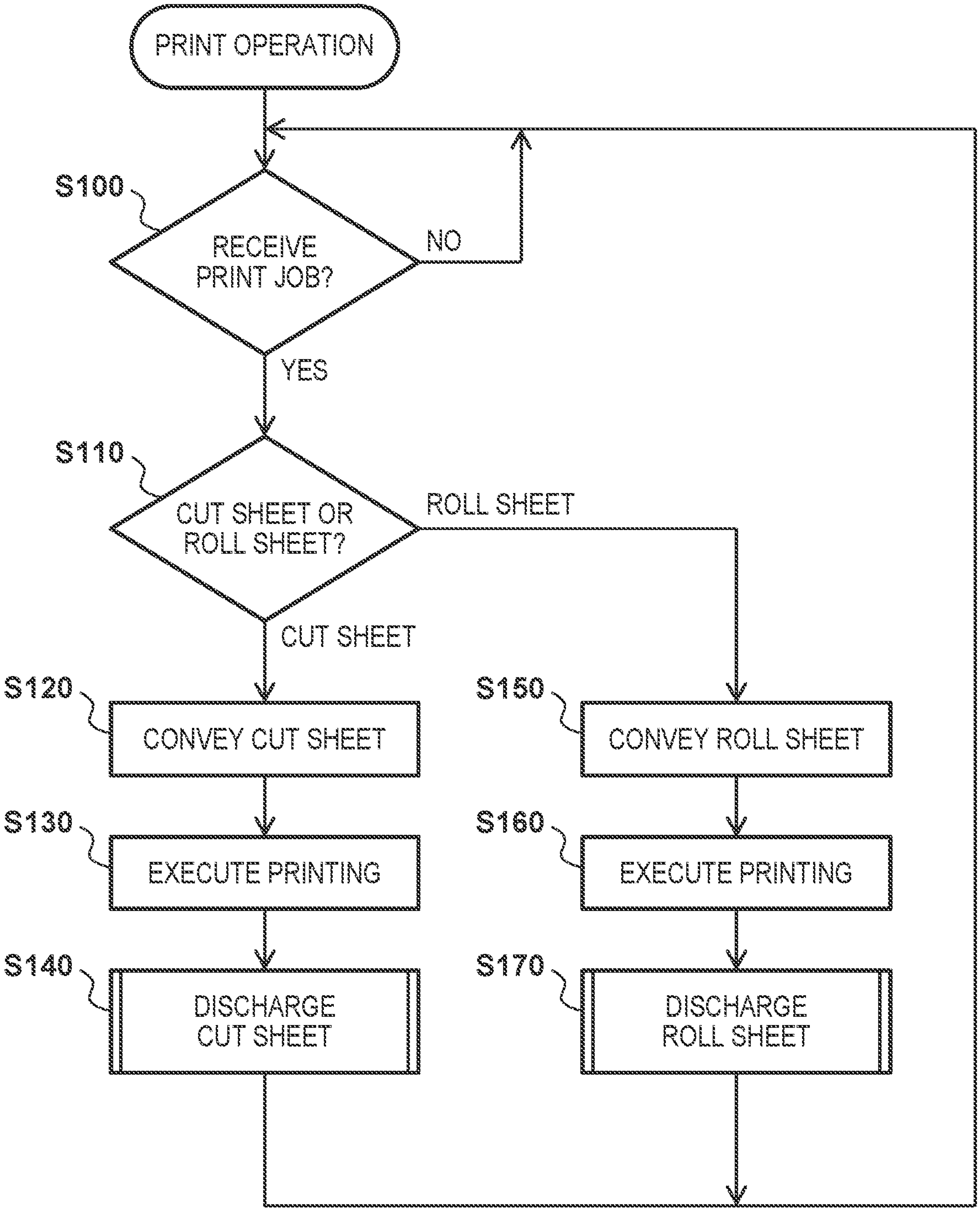
FIG. 2 is a flowchart indicating an example of a form of printing by the printing apparatus.
Figure 3A:
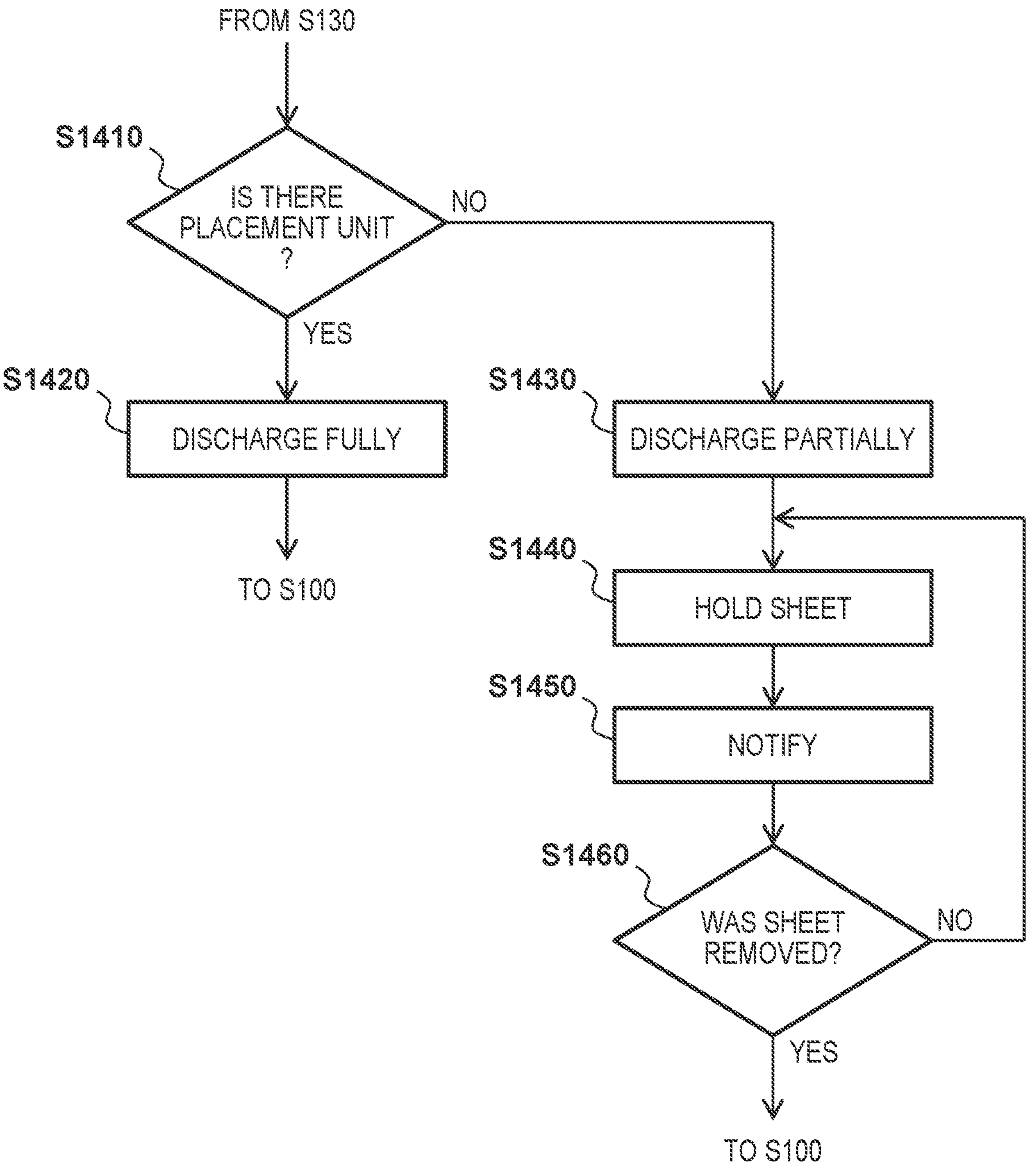
FIG. 3A is a flowchart indicating an example of a form of printing by the printing apparatus.
Figure 3B:
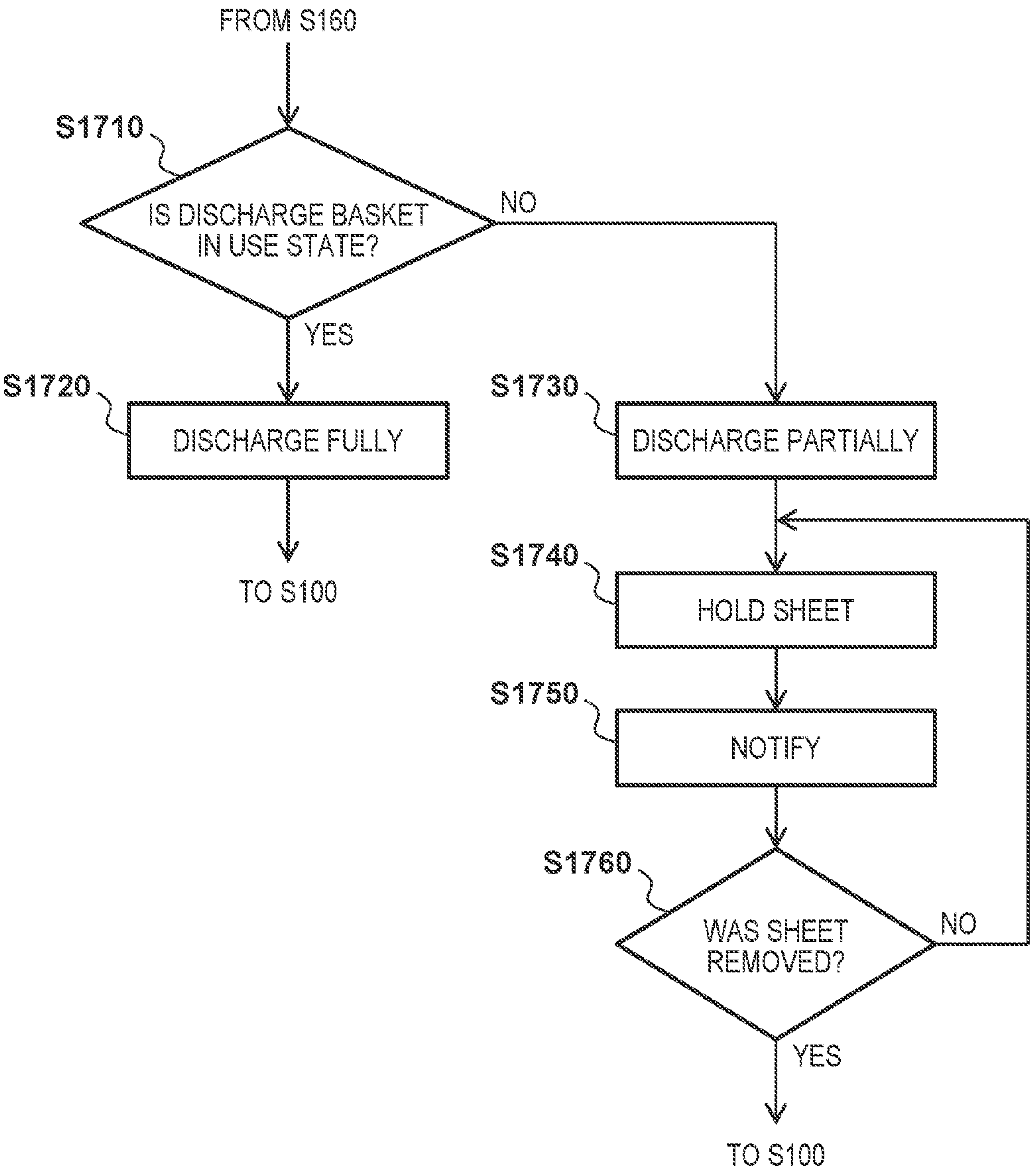
FIG. 3B is a flowchart indicating an example of the form of the printing by the printing apparatus.

FIG. 2 is a flowchart indicating an example of a form of printing by the above described printing apparatus 1. FIG. 3A and FIG. 3B indicate details with regards to a portion of the steps described in FIG. 2. It is assumed that the present flowchart is started in accordance with the printing apparatus 1 entering a state in which printing can be executed and is ended in accordance with the printing apparatus 1 entering a state in which printing cannot be executed. An overview of the present flowchart is that in a case where a predetermined condition is met, the discharge sheet SH is held by the pair of rollers 131*d*. Note that the present flowchart is mainly realized by the control unit 18, and for example, determination in each step is performed by the control unit 18 functioning as the determination unit. In step S100 (hereinafter, indicated simply as "S100"; the same applies to other steps), it is determined whether or not a print job was inputted into the printing apparatus 1. Here, to facilitate understanding, it is assumed that the print job instructs printing related to a single sheet SH, in other words, the discharge sheet SH as a product is a single sheet. In a case where a print job was inputted, the processing proceeds to step S110, and otherwise, the processing returns to S100, in other words, the printing apparatus 1 is in a standby state until a print job is inputted.

In S110, it is determined whether the printing target is a cut sheet or a roll sheet. Generally, the print job, in addition to printing information that indicates printing content itself, includes related information such as information that indicates whether to perform printing and in relation to which printing medium, and S110 is performed based on that related information. In a case where the printing target is the cut sheet, the processing proceeds to S120, and in a case of the roll sheet, the processing proceeds to S150.

In S120, the pair of rollers 131*a* is driven and controlled to convey a single cut sheet from the cut sheet stacking unit 121*a*, and moreover, the cut sheet is conveyed toward the printing unit 11 by the pair of rollers 131*c*.

In S130, printing based on a print job is performed by the printing unit 11 in relation to the cut sheet while the cut sheet is conveyed by the pair of rollers 131*c*.

In S140, an operation of discharging, as the discharge sheet SH from the discharge port 20 by the pair of rollers 131*d*, the cut sheet onto which printing was performed by the printing unit 11 is started. Then, the processing returns to S100.

In S150, the pair of rollers 131*b* is driven and controlled to convey a roll sheet from the roll sheet mounting unit 121*b*, and moreover, the roll sheet is conveyed toward the printing unit 11 by the pair of rollers 131*c*.

In S160, printing based on a print job is performed by the printing unit 11 in relation to the roll sheet while the roll sheet is conveyed by the pair of rollers 131*c*.

In S170, the roll sheet onto which printing was performed by the printing unit 11, after being conveyed to the downstream side 1*w* the pair of rollers 131*d*, is cut by the cutter unit, and then the cut sheet is discharged as the discharge sheet SH from the discharge port 20 by the pair of rollers 131*d*. Then, the processing returns to S100.

FIG. 3A indicates details of S140, S140 includes S1410 to S1460 and an overview thereof is that discharging of the discharge sheet SH is completed or the discharge sheet SH is held based on the existence or absence of the placement unit 14.

In S1410, based on a detection result of the detection unit 16, it is determined whether or not the placement unit 14 is attached onto the main body of the printing apparatus 1. In a case where the placement unit 14 is attached onto the main body of the printing apparatus 1, the processing proceeds to S1420, and otherwise, the processing proceeds to S1430.

In S1420, the pair of rollers 131*d* is driven to discharge from the discharge port 20 the entirety of the discharge sheet SH and then the processing returns to S100. Because the placement unit 14 is attached onto the main body of the printing apparatus 1, the discharge sheet SH is placed on the placement unit 14.

In S1430, the pair of rollers 131*d* is driven to partially discharge from the discharge port 20 the discharge sheet SH so as to enter a state in which an upstream end of the discharge sheet SH remains within the main body (within the discharge port 20) of the printing apparatus 1. The discharge sheet SH may be partially discharged so as to be held at least by the pair of rollers 131*d*, and regions other than the upstream end may remain within the main body of the printing apparatus 1. In the present embodiment, partial discharging is performed so that at least the upstream end of the discharge sheet SH remains in a region that can be detected by the detection unit 132 (e.g., region that faces the detection unit 132). By this, it can be detected that the discharge sheet SH is removed by the user.

Figure 4:
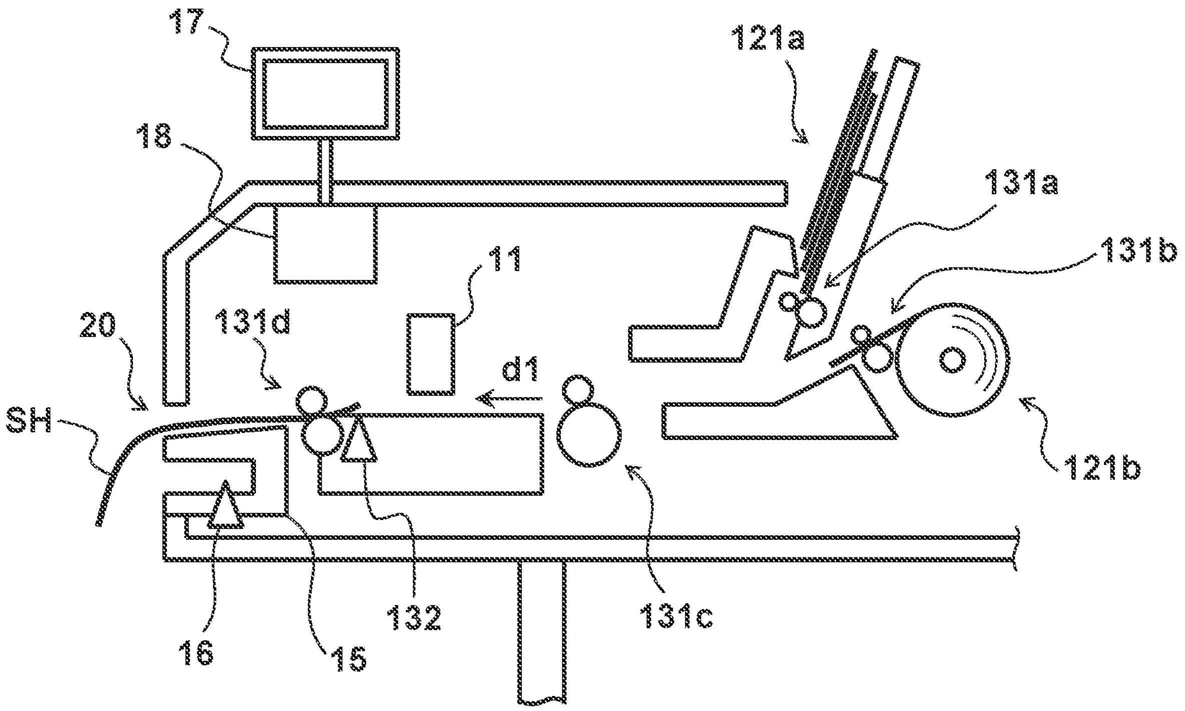
FIG. 4 is a schematic side view illustrating an example of a form of holding a discharge sheet.

In S1440, the discharge sheet SH that was partially discharged from the discharge port 20 in S1430 is held by the pair of rollers 131*d*. This is realized by the pair of rollers 131*d* sandwiching the discharge sheet SH in a state in which the rollers do not rotate. By this, the discharge sheet SIT is held in a state in which the sheet is partially exposed from the main body of the priming apparatus 1 without dropping from the main body (or the discharge port 20) of the printing apparatus 1 (refer to FIG. 4).

In S1450, the user is notified that the discharge sheet SH is in a state in which the sheet is held. This notification may be performed by displaying predetermined information on the display/operation input unit 17 and may alternatively or additionally be performed by sounding an alerting sound and the like.

In S1460, based on the detection result of the detection unit 132, it is determined whether or not the discharge sheet SH in the above held state was removed. In a case where the discharge sheet SH was removed by the user, the processing returns to S100 and otherwise, the processing returns to S1440. In other words, until the discharge sheet SH is removed, execution of printing related to the next sheet SH by the printing unit 11 and execution of conveyance of the sheet SH by the conveyance unit 13 are prevented, and the next printing is not started, FIG. 3B indicates details of S170. S170 includes S1710 to S1760 and an overview thereof is that discharging of the discharge sheet SH is completed or the discharge sheet SH is held based on the state of the discharge basket 19.

In S1710, based on the detection result of the detection unit 191, it is determined whether the discharge basket 19 is in the use state or the non-use state. In a case where the discharge basket 19 is in the use state, the processing proceeds to S1720, and otherwise, the processing proceeds to S1730.

In S1720, similarly to S1420, the pair of rollers 131*d* is driven to discharge from the discharge port 20 the entirely of the discharge sheet SH and then the processing returns to S100. Because the discharge basket 19 is in the use state, the discharge sheet SH is received by the discharge basket 19.

In S1730, similarly to S1430, the pair of rollers 131*d* is driven to partially discharge from the discharge port 20 the discharge sheet SH so as to enter a state in which at least the upstream end of the discharge sheet SH remains within the main body of the printing apparatus 1.

In S1740, similarly to S1440, the discharge sheet SH that was partially discharged from the discharge port 20 in S1730 is held by the pair of rollers 131*d*, By this, the discharge sheet SH is held in a state in which the sheet is partially exposed from the main body of the printing apparatus 1 without dropping from the main body of the printing apparatus 1. Note that because the roll sheet is typically long and has a risk of contacting an installation surface (floor surface) of the printing apparatus 1 when discharged from the discharge port 20, a length to discharge the discharge sheet SH may be set or changed in accordance with the height from the installation surface to the discharge port 20.

In S1750, similarly to S1450, by displaying predetermined information on the display/operation input unit 17, the user is notified that the discharge sheet SH is in a state in which the sheet is held.

In S1760, similarly to S1460, based on the detection result of the detection unit 132, it is determined whether or not the discharge sheet SH in the above held state was removed. In a case where the discharge sheet SH was removed by the user, the processing returns to S100 and otherwise, the processing returns to S1740. In other words, until the discharge sheet SH is removed, the next printing is not started.

SUMMARY

By virtue of such a form of printing, because the discharge sheet SH, in a case where it may drop from the main body (or the discharge port 20) of the printing apparatus 1, is held by the pair of rollers 131*d* serving as the holding unit, it becomes possible to prevent unnecessary damage to the discharge sheet SH due to the drop. Accordingly, by virtue of the present embodiment, it becomes possible to improve quality of printing by the printing apparatus 1.

First Embodiment

Although in the embodiment, to facilitate understanding, the print job instructs printing related to a single sheet SH, the same control may be performed with regards to a case where printing related to a plurality of sheets SH is instructed.

For example, a case where printing in relation to N sheets of sheets SH, where N is an integer greater than or equal to two, is performed is considered. Here, in a case where K-th sheet SH, where K is an integer greater than or equal to 1 and less than N, is discharged in a state in which the placement unit 14 is not attached onto the main body of the printing apparatus 1, the sheet SH is held by the pair of rollers 131*d* (refer to S1440 to S1460). In the meantime, execution of printing related to (K+1)-th sheet by the printing unit 11 and conveyance of the sheet by the conveyance unit 13 are prevented; in other words, the remaining printing is interrupted.

Meanwhile, in the meantime, in a case where the above held K-th sheet is removed by the user, printing related to (K+1)-th sheet by the printing unit 11 and conveyance of the sheet by the conveyance unit 13 are executed; in other words, the remaining printing is resumed.

Second Embodiment

Although in the embodiment, to facilitate understanding, a form in which two types, the cut sheet and the roll sheet, are the printing targets was exemplified, in a case where there is a plurality of cut sheet sizes and/or in a case where there is a plurality of roll sheet widths, the same control may be performed.

For example, assuming that in a case of the sheet SH that is less than or equal to a predetermined size (width and/or length is less than or equal to a predetermined dimension), the sheet SH is placed on the placement unit 14, and otherwise, the sheet SH is discharged into the discharge basket 19, changes may be added to the flowchart in FIG. 3A and FIG. 3B, In other words, even in a case of the roll sheet, so long as the size can be received by the placement unit 14, control to proceed to S1410 in FIG. 3A may be performed. Similarly, even in a case of the cut sheet, if the size is difficult to receive by the placement unit 14, control to proceed to S1710 in FIG. 3B may be performed. Alternatively, assuming that a plurality of types of placement units 14 are provided and that one that supports the sheet is attached onto the main body of the printing apparatus 1, changes may be made to the above flowchart.

These can be realized, for example, in S1410, by determining whether or not the size of the sheet SH to be the printing target is a size supported by the placement unit 14. In other words, in a case where the size of the sheet SH to be the printing target is a size supported by the placement unit 14 and the placement unit 14 is not attached onto the main body of the printing apparatus 1, the discharge sheet SH may be held by the pair of rollers 131*d* (refer to S1440 to S1460).

Third Embodiment

In the aforementioned embodiment, the form in which in a case where the discharge sheet SH in a state in which it is held by the pair of rollers 131*d* is removed by the user, the processing returns to S100 (refer to S1460 and S1760) and the next printing can be started was exemplified. Although removal of the discharge sheet SH may be performed manually by the user, this may cause creases, wrinkles, tears, and the like to the discharge sheet SH. Accordingly, removal of the discharge sheet SH may be performed by another method.

For example, the user may use the display/operation input unit 17 to instruct to discharge from the main body of the printing apparatus 1 the above held discharge sheet SH. In accordance with this, the control unit 18 rotates the pair of rollers 131*d*, and by this the above holding is disengaged and then the discharge sheet SH is discharged from the main body of the printing apparatus 1. By this, the user can accept the discharge sheet SH.

As another example, the user, in accordance with notification in S1450, can attach onto the main body of the printing apparatus 1 the placement unit 14. Because the detection unit 16 can detect that the placement unit 14 is attached onto the main body of the printing apparatus 1, the control unit 18 can rotate the pair of rollers 131*d* in accordance with the detection by the detection unit 16 and have the discharge sheet SH discharged from the main body of the printing apparatus 1.

By virtue of the above form of the removal of the discharge sheet SH, it becomes possible to prevent unnecessary damage to the discharge sheet SH and therefore, it becomes possible to further improve quality of printing by the printing apparatus 1.

Fourth Embodiment

Although as previously described, sheets SH of various sizes may be used as the printing target, it is conceivable that their materials also vary. Accordingly, it is conceivable that something (e.g., tracing paper) configured by a material that is relatively difficult to place onto the placement unit 14 may be the printing target. In such a case, irrespective of the existence or absence of the placement unit 14, holding of the discharge sheet SH by the pair of rollers 131*d* may be performed. This can be realized by specifying the material of the sheet SH to be the printing target.

For example, in a case where related information included in a print job indicates information that indicates a material of a printing medium, the above holding by the pair of rollers 131*d* may be performed based on the related information. Alternatively, the printing apparatus 1 may further comprise a specification unit that specifies a material of the sheet SH that is being conveyed by the conveyance unit 13 and the above holding may be performed based on a result of the specification. In the specification unit, a publicly known optical sensor may be used.

Program

The present invention can also be implemented by processing of supplying a program configured to implement at least one function of the above-described embodiments to a system or an apparatus via a network or a storage medium, and reading out and executing the program by at least one processor in the computer of the system or the apparatus. The present invention may also be implemented by a circuit (for example, ASIC) that implements at least one function.

Others

In the above description, the printing apparatus 1 that uses an inkjet printing method has been described as an example, but the printing method is not limited to the above-described forms. Further, the printing apparatus 1 may be a single-function printer having only a printing function, or a multifunction printer having a plurality of functions such as a printing function, a fax function, and a scanner function. Additionally, for example, a manufacturing apparatus for manufacturing color filters, electronic devices, optical devices, microstructures, or the like by a predetermined printing method may be applicable.

Also, the term "print" in this specification is to be broadly interpreted. Accordingly, an aspect of the term "print" is regardless of whether or not the object to be formed on the printing medium is meaningful information such as characters, and graphics, and whether or not the object is visualized so that a human can visually perceive it.

Additionally, the term "printing medium" is to be broadly interpreted, similarly to the term "print" described above. Accordingly, the concept of the term "printing medium" may include any member that can receive ink, such as cloth, plastic film, metal plates, glass, ceramics, resin, wood, and leather, in addition to paper to be commonly used.

Furthermore, the term "ink" is to be broadly interpreted, similarly to the term "print" described above. Accordingly, the concept of "ink" can include, in addition to a liquid that forms an image, a figure, a pattern, or the like by being applied onto a print medium, additional liquids that can be used for processing a print medium, processing ink (for example, coagulation or insolubilization of colorants in ink applied onto a print medium), or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-039214, filed on Mar. 6, 2020, which is hereby incorporated by reference herein in its entirety.

What is claimed is:

1. A multifunction printing apparatus, having a printing function and a scanner function, and comprising:

a mounting unit onto which a roll sheet that is wound in a rolled shape is mounted;

a stacking unit onto which a plurality of cut sheets that are not wound in a rolled shape are stacked;

a first pair of rollers configured to convey one of the roll sheet and a cut sheet in a conveyance direction to a printing unit configured to print an image by ejecting a liquid; and a second pair of rollers provided downstream of the printing unit in the conveyance direction, and configured to convey one of the roll sheet and the cut sheet printed by the printing unit, wherein the second pair of rollers holds the cut sheet, after completion of printing, while not conveying the cut sheet, and a placement unit detachably attached to the multifunction printing apparatus, the placement unit being configured to place the cut sheets onto which printing has been performed by the printing unit.

2. The multifunction printing apparatus according to claim 1, wherein, in a case in which the second pair of rollers holds the cut sheet while not conveying the cut sheet, the printing apparatus notifies a user that the cut sheet is held.

3. The multifunction printing apparatus according to claim 1, further comprising:

a notification unit configured to notify a user that the cut sheet is held, in a case in which the second pair of rollers holds the cut sheet while not conveying the cut sheet.

4. The multifunction printing apparatus according to claim 1, further comprising:

an operation unit configured to accept an operation input by a user.

5. The multifunction printing apparatus according to claim 1, wherein, after completion of printing the cut sheet, the second pair of rollers nips the cut sheet in a state in which rotation of the second pair of rollers is stopped.

6. The multifunction printing apparatus according to claim 1, further comprising:

a detection unit provided upstream of the second pair of rollers in the conveyance direction, the detection unit being configured to detect whether a sheet is nipped by the second pair of rollers whose rotation is stopped.

7. The multifunction printing apparatus according to claim 1, further comprising:

a detection unit configured to detect whether the placement unit is attached to the printing apparatus.

8. The multifunction printing apparatus according to claim 1, wherein the stacking unit is provided downstream of the mounting unit in the conveyance direction.

9. The multifunction printing apparatus according to claim 1, wherein the roll sheet onto which printing has been performed by the printing unit is cut by a cutter.

10. The multifunction printing apparatus according to claim 9, wherein the second pair of rollers holds the sheet cut by the cutter, after completion of printing, while not conveying the sheet.

11. The multifunction printing apparatus according to claim 1, wherein the printing unit comprises an inkjet head that discharges ink.

12. The multifunction printing apparatus according to claim 1, further comprising the printing unit.

13. The multifunction printing apparatus according to claim 1, wherein the printing unit moves in a direction that intersects the conveyance direction.

* * * * *